United States Patent
Lewis et al.

(10) Patent No.: US 8,870,699 B2
(45) Date of Patent: Oct. 28, 2014

(54) LUBRICATION OIL SYSTEM FOR A REDUCTION GEARBOX

(71) Applicant: Pratt & Whitney Canada Corp., Longueuil (CA)

(72) Inventors: Alain Lewis, Brossard (CA); Roberto Brito, Beloeil (CA); Michel Desjardins, St-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/793,156

(22) Filed: Mar. 11, 2013

(65) Prior Publication Data

US 2014/0256494 A1  Sep. 11, 2014

(51) Int. Cl.
*F16H 57/04* (2010.01)
*F02G 3/00* (2006.01)
*F01D 25/18* (2006.01)

(52) U.S. Cl.
CPC .............. *F16H 57/042* (2013.01); *F01D 25/18* (2013.01)
USPC .......................................... 475/159; 60/39.08

(58) Field of Classification Search
CPC ..... F01D 25/20; F01D 25/18; F16N 2210/02; F16H 57/045; F16H 47/0421
USPC ........................... 475/159; 184/6.2, 6.11, 6.12
See application file for complete search history.

(56) References Cited

U.S. PATENT DOCUMENTS

| | | | |
|---|---|---|---|
| 4,153,141 A | 5/1979 | Methlie | |
| 4,511,016 A | 4/1985 | Döell | |
| 4,531,358 A | 7/1985 | Smith | |
| 5,141,179 A | 8/1992 | Gautier | |
| 5,411,116 A * | 5/1995 | Kish et al. | 184/6.12 |
| 6,463,819 B1 | 10/2002 | Rago | |
| 6,691,830 B2 | 2/2004 | Blanc et al. | |
| 6,996,968 B2 * | 2/2006 | Peters et al. | 60/39.08 |
| 7,118,336 B2 * | 10/2006 | Waddleton | 416/1 |
| 7,530,430 B2 | 5/2009 | Hoang et al. | |
| 7,789,202 B2 | 9/2010 | Lee et al. | |
| 8,020,665 B2 | 9/2011 | Sheridan et al. | |
| 8,083,030 B2 * | 12/2011 | Portlock | 184/6.11 |
| 8,181,746 B2 | 5/2012 | Szolomayer et al. | |
| 8,210,316 B2 * | 7/2012 | DiBenedetto et al. | 184/6.11 |
| 8,215,454 B2 | 7/2012 | Portlock et al. | |
| 8,230,974 B2 | 7/2012 | Parnin | |
| 8,235,176 B2 | 8/2012 | Hannaford et al. | |
| 8,307,626 B2 * | 11/2012 | Sheridan | 60/39.08 |
| 8,602,166 B2 * | 12/2013 | Mullen et al. | 184/6.26 |
| 2011/0150655 A1 * | 6/2011 | Tietze et al. | 416/170 R |
| 2011/0168495 A1 * | 7/2011 | Subramaniam et al. | 184/6.12 |
| 2012/0324899 A1 * | 12/2012 | DiBenedetto et al. | 60/772 |

* cited by examiner

*Primary Examiner* — Dirk Wright
(74) *Attorney, Agent, or Firm* — Norton Rose Fulbright Canada LLP

(57) ABSTRACT

A reduction gear box is part of a gas turbine engine and includes a casing and reduction epicyclic gear stages within the casing. The reduction gear stages comprising at least an epicyclic array of gears meshing together with at least one planetary gear mounted for rotation on a gear carrier and a bearing associated therewith. A lubricating oil delivery system is provided within the casing, surrounding a portion of the gear carrier. The oil delivery system includes a conduit; a closed oil reservoir; a first metered opening communicating the conduit with the reservoir and a plurality of metered outlet openings communicating the reservoir with the gear carrier and the bearing such that the reservoir is filled with oil in normal flight operating conditions and the oil trapped in the reservoir is released to the carrier and bearing when a temporary drop in the oil system pressure occurs.

12 Claims, 4 Drawing Sheets

LUBRICATION OIL SYSTEM FOR A REDUCTION GEARBOX

TECHNICAL FIELD

The described subject matter relates generally to gas turbine engines, and more particularly to a reduction gearbox.

BACKGROUND OF THE ART

A reduction gearbox for a gas turbine engine may have one or more epicyclic gear trains used for speed reduction and to transmit power. The planet gears, part of the epicyclic gear train, are typically mounted on journal bearings. The bearings must be continuously fed with lubricating oil for adequate operation. Various manoeuvres can occur during flight, and some of these manoeuvres can affect momentarily the lubricating oil operating pressure. Under manoeuvres generating a negative "g", the oil system pressure may drop significantly to the extent that the oil flow delivered to the journal bearings may be interrupted.

There exist systems for delivering lubricating oil to bearings in a reduction gearbox, to avoid the starving of the bearings during negative "g" circumstances, which systems include additional pumps and/or valves to supplement the lubricating oil system.

There is a need for a system to retain lubricating oil around the bearings, in a reduction gearbox, that is simple and requires fewer accessories in order to provide protection against oil starvation of the bearings during negative "g" circumstances.

SUMMARY

In accordance with an embodiment of the present disclosure, there is provided a reduction gear box for a gas turbine engine comprising a casing; at least one reduction epicyclic gear stage, within the casing, the reduction gear stage comprising at least an array of gears meshing together with at least one gear mounted for rotation on a gear carrier and at least one bearing associated therewith; a lubricating oil delivery system provided within the casing and surrounding a portion of the gear carrier, the oil delivery system comprising a conduit; a closed oil reservoir; a first metered opening communicating the conduit with the reservoir and at least one metered outlet opening communicating the reservoir with the gear carrier and the bearing such that the reservoir is filled with oil in normal flight operating conditions and the oil trapped in the reservoir is released to the carrier and bearing when a temporary drop in the oil system pressure occurs.

In accordance with another embodiment of the present disclosure, there is provided an oil supply system for a reduction gearbox in a gas turbine engine, the reduction gearbox of the type having at least one reduction epicyclic gear stage, within the casing, the reduction gear stage comprising at least an array of gears meshing together with at least one gear mounted for rotation on a gear carrier and a bearing associated therewith, the engine being subject to normal flight and negative "g" flight conditions; the oil supply system comprising an oil reserve system consisting of a closed reservoir provided adjacent the gear carrier, a restricted inlet opening associated with the reservoir for allowing oil to enter and fill the reservoir in normal flight conditions and a plurality of metered outlet openings to feed the oil from the reservoir to the gear carrier when a negative "g" condition occurs.

In accordance with yet another embodiment of the present disclosure, there is provided a method of supplying lubricating oil to a reduction gearbox wherein the gearbox includes reduction gear stages and a gear carrier mounting at least a gear rotatable in the gear carrier and an associated bearing, the method comprising: forming a closed reservoir radially outwardly of the gear carrier within the reduction gear box, and a restricted opening to the reservoir for delivering lubricating oil through; forming an annular oil channel surrounding the gear carrier and in oil communication therewith; providing metered openings to communicate the reservoir with the annular oil channel so that the oil trapped in the reservoir is distributed into the oil channel to the gear carrier when a temporary pressure drop occurs in the oil delivery system.

Further details of these and other aspects of the present invention will be apparent from the detailed description and figures included below.

DESCRIPTION OF THE DRAWINGS

Reference is now made to the accompanying figures in which.

DESCRIPTION OF THE PREFERRED EMBODIMENTS

Figure 1:
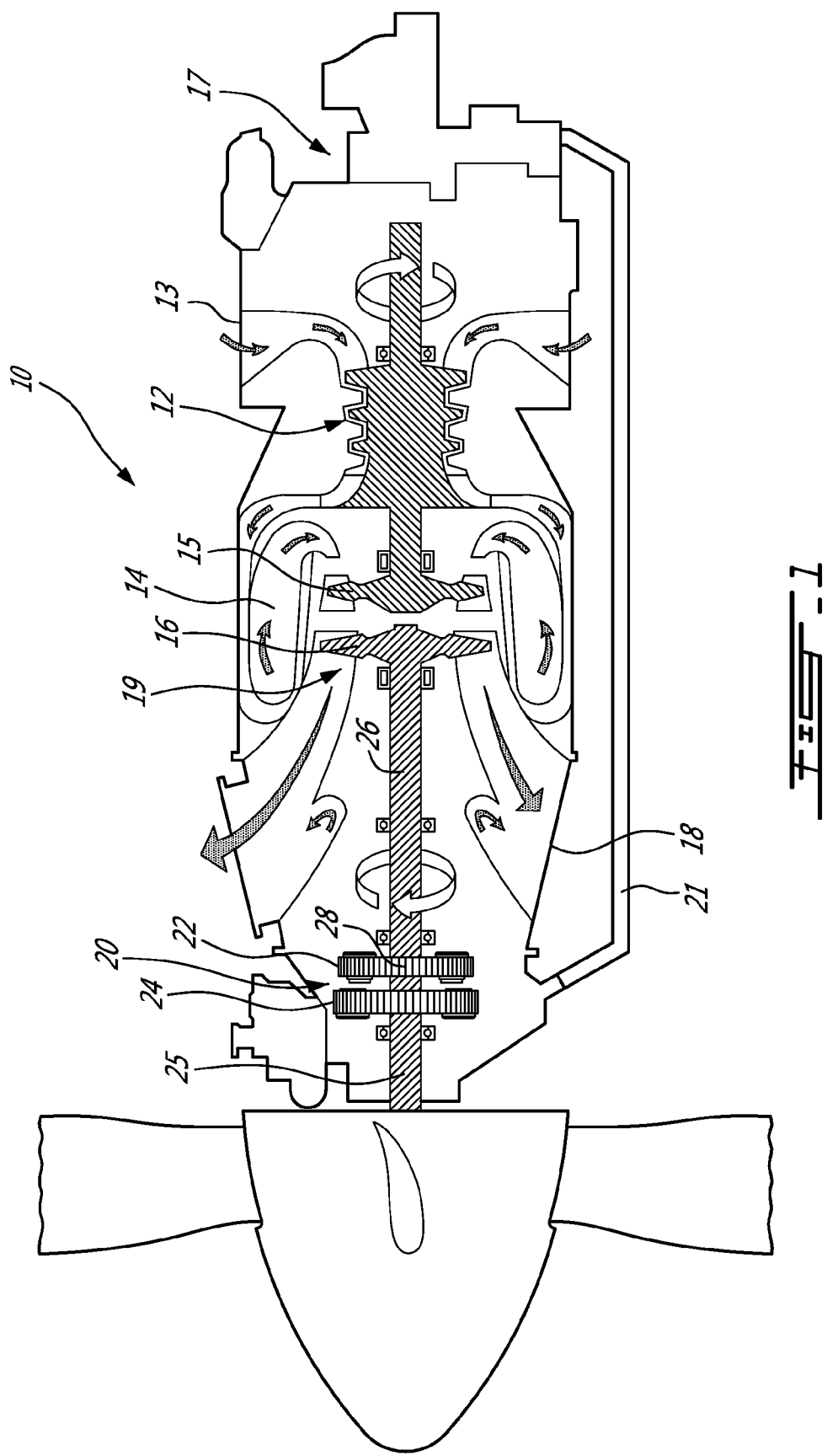
FIG. 1 is a schematic axial cross-section of a gas turbine engine.

Referring to FIG. 1, there is shown a turboprop gas turbine engine 10 generally having a power plant including a compressor section 12, a combustion chamber 14 and a turbine section 16 with an exhaust duct 18. The engine 10 also includes a reduction gearbox 20 at the front end thereof. Lubricating oil is fed to the reduction gearbox 20 by means of an oil conduit 21.

The operation of such a gas turbine engine is well known, and occurs generally as follows, by means of example only. Air enters the engine through the inlet 13 and is compressed by the compressor section 12. The compressed air is then fed to the combustion chamber 14 where it is mixed with fuel and ignited. The hot gas then expands through the turbine section 16, including the compressor turbine 15 which drives the compressor 12 and the accessory gearbox 17; and the power turbine section 19, which is mechanically independent from the compressor turbine 15, drives the propeller shaft 25 by means of the reduction gearbox 20. The reduction gearbox 20 includes first and second reduction epicyclic gear stages 22 and 24. The propeller shaft 25 may serve to drive other equipment such as a generator, etc.

Figure 2:
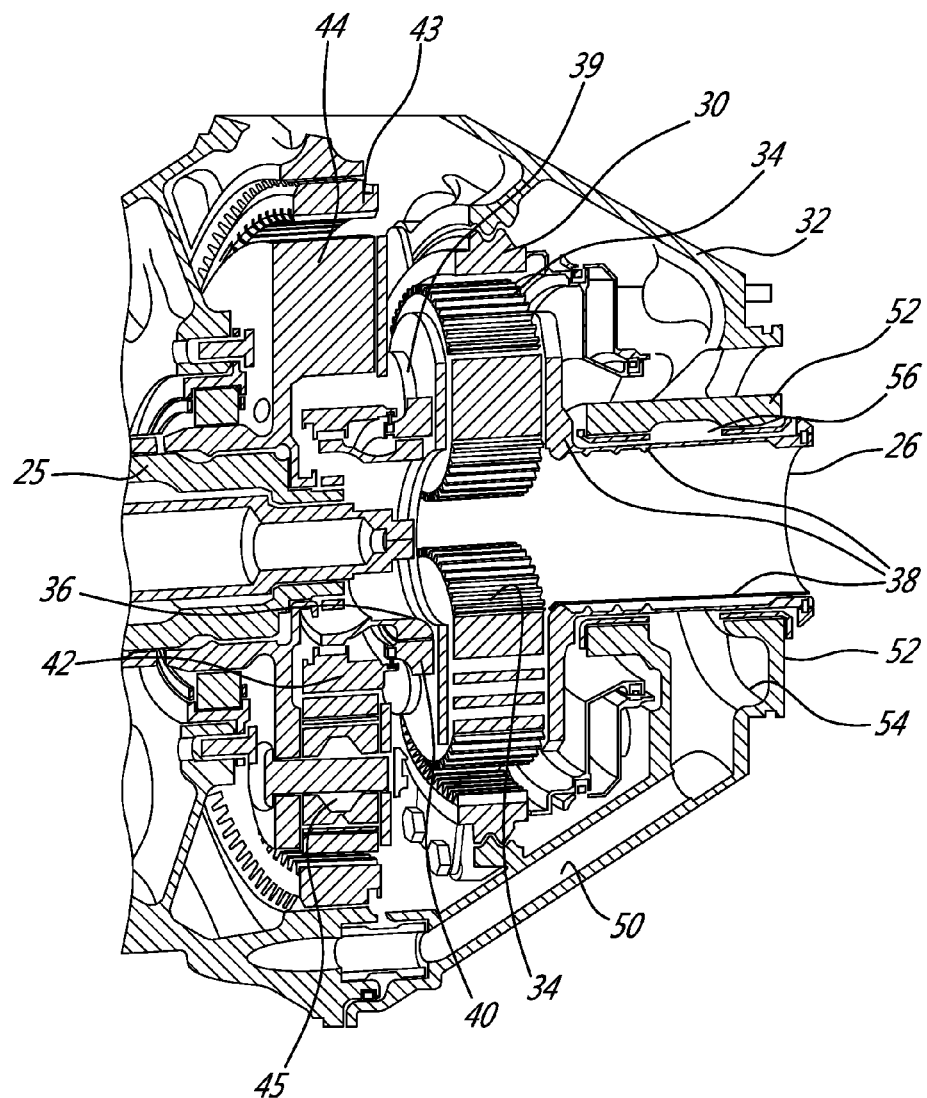
FIG. 2 is a perspective, fragmented, axial cross-sectional view showing a detail of FIG. 1.

Referring now to FIG. 2, the reduction gearbox 20 will now be described in more detail. The first reduction epicyclic gear stage 22 receives input from the power plant through power turbine output shaft 26 which drives the first stage sun gear (28 in FIG. 1). The first stage outer ring gear 30 is held stationary within the gearbox casing 32, and a plurality of planet gears 34 are supported within the ring gear 30 by a first stage carrier balancing assembly 36 comprising a first stage planet gear carrier 38 and a coupling adapter 40. Each planet gear 34 is journalled on a bearing 39 and is rotatably mounted in the planetary carrier 38 about an axis, and is in meshing engagement with both the sun gear 28 and the outer ring gear 30. The drive shaft 26, sun gear 28, ring gear 30 and planetary carrier 38 are all concentric about a central axis, and both the sun gear 28 and planetary carrier 38 are adapted to rotate about the central axis. Each planet gear 34 has its own individual axis of rotation, about which each rotates and the planet gears 34 are thereby adapted to rotate the planetary carrier 38 about the central axis when driven by shaft 26 through sun gear 28.

The coupling adapter 40 is fastened to, and is therefore adapted to rotate with, the first stage planetary carrier 38 and serves to transfer torque to the second reduction stage 24. The second stage 24 operates substantially as per the first stage described above, with certain modifications which will be apparent to those skilled in the art, and thus is only described briefly here. The second stage 24 similarly comprises a central second stage sun gear 42 supported within the adapter 40, which is in meshing engagement with a plurality of second stage planet gears 44 which rotate within a stationary second stage outer ring gear 43. The revolving second stage planet gears 44 are journalled on bearings 45 and rotate within a second stage planetary carrier 46 which provides output torque to the propeller shaft 25. The second stage sun gear 42 and planetary carrier 46 also rotate about the central axis of the reduction gearbox 20, and the second stage planet gears 44 rotate about their individual axes of rotation.

A main oil conduit 50 supplies the lubricating oil to the journal bearings of the first and second reduction gear stages 22, 24. The conduit 50 communicates with passages in the casing core 52 surrounding the first stage gear carrier 38, represented by the annular oil conduit 56. The gear carrier 38 is designed to pump oil to the bearings 39.

Figure 3:
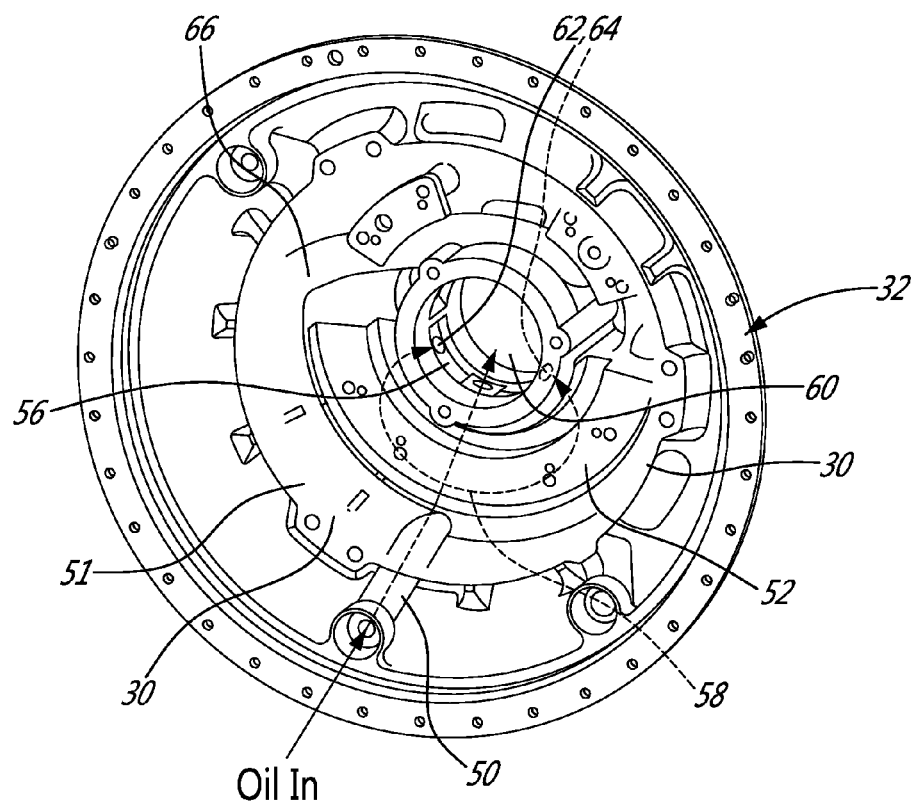
FIG. 3 is an aft perspective view of a detail shown in FIG. 2.

In the present embodiment as illustrated in FIGS. 2 and 3, a cavity, forming an oil reservoir 54, has been formed in the core 52. Oil is supplied to the reservoir 54 by the conduit 50 through a restricted opening 58. The reservoir 54 will be maintained full during normal flight conditions by means of the oil pressure regulating system, which will ensure constant pressurized oil feed to the reduction gearbox and therefore to the journal bearings 39 and 45.

As shown in FIG. 3, three metered openings 60, 62 and 64 will allow a metered supply of oil to the annular oil channel 56, surrounding the gear carrier 38 (not shown in FIG. 3 but shown in FIG. 2). Lubricating oil may also be fed to the annular oil channel 56, surrounding the carrier 38 through other conventional feed conduits, such as conduit 51, shown supplying the torque meter 66.

Various manoeuvres can occur during flight. Some of these manoeuvres can affect, momentarily, the oil system operating pressure. Under manoeuvres generating a negative "g", the oil system pressure may significantly drop, and the oil flow delivered to the Journal bearings 39, 45 may stop. Therefore the journal bearings may lose their capability to support load. The first stage journal bearings are highly sensitive to oil flow interruption. As a result, one or more planet gears 34 may generate heat which may result in seizure.

Figure 4A:
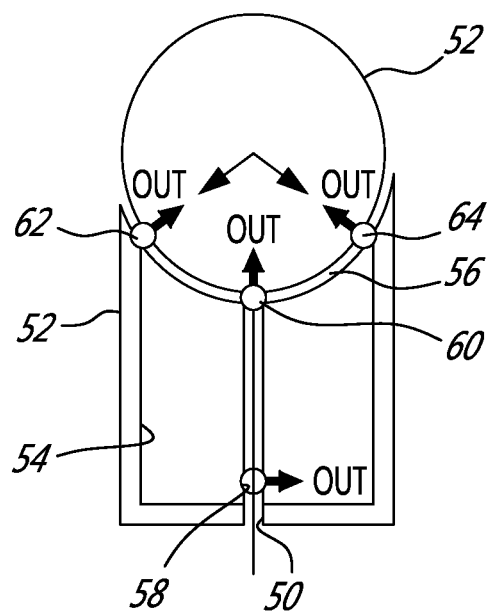
FIG. 4a is a schematic diagram illustrating the detail shown in FIGS. 2 and 3, in operation.
Figure 4B:
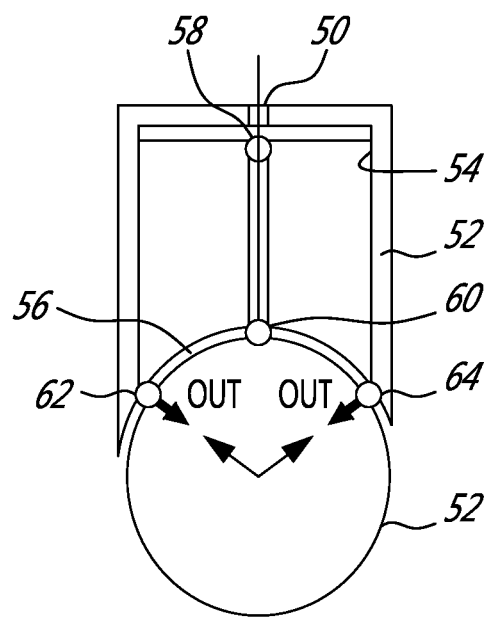
FIG. 4b is a schematic diagram similar to FIG. 4a illustrating the detail shown in FIGS. 2 and 3 with the operation under different conditions.

FIGS. 3, 4a and 4b illustrate what may occur given the modifications described in the present embodiment. Referring to FIG. 4a, oil is fed from the conduit 50 into the reservoir 54 through the opening 58 and then to the oil annular channel 56 by means of primary outlet opening 60 as well as secondary outlet openings 62 and 64. When the system pressure drops significantly, oil flow is interrupted, for instance while the flight is operating under a negative "g", very little oil will flow into the reservoir by means of inlet opening 58 due to the drastically reduced oil pressure in the system. The oil accumulated within the reservoir 54 will continue to pass, at a lower pressure, into the annular oil channel 56 through the metered openings 60, 62 and 64. The oil is trapped in the reservoir 54 during this temporary negative "g" flight phase since it cannot drain rapidly from the small inlet opening 58. Thus, oil will continue to be pumped to the bearings 39 by means of the planetary gear carrier 38.

The above description is meant to be exemplary only, and one skilled in the art will recognize that changes may be made to the embodiments described without departing from the scope of the invention disclosed. For example, the reduction gear box 20 is illustrated as being in a turboprop, but may be in any other type of gas turbine engine using such a reduction gear box. Still other modifications which fall within the scope of the present invention will be apparent to those skilled in the art, in light of a review of this disclosure, and such modifications are intended to fall within the appended claims.

The invention claimed is:

1. A reduction gear box for a gas turbine engine comprising a casing; at least one reduction epicyclic gear stage, within the casing, the reduction gear stage comprising at least an array of gears meshing together with at least one gear mounted for rotation on a gear carrier and at least one bearing associated therewith; a lubricating oil delivery system provided within the casing and surrounding a portion of the gear carrier, the oil delivery system comprising a conduit; a closed oil reservoir; a first metered opening communicating the conduit with the reservoir and at least one metered outlet opening communicating the reservoir with the gear carrier and the bearing such that the reservoir is filled with oil in normal flight operating conditions and the oil trapped in the reservoir is released to the carrier and bearing when a temporary drop in the oil system pressure occurs.

2. The reduction gearbox as defined in claim 1 wherein the oil delivery system is defined partially within a portion of the casing and the reservoir is a cavity defined in the portion of the casing.

3. The reduction gear box as defined in claim 2 wherein an annular oil distribution channel is defined on the casing in contact with the gear carrier and the bearing and the metered outlet opening is in communication with the annular channel.

4. The reduction gear box as defined in claim 3 comprising at least three of said metered outlet opening communicating the reservoir with the annular channel.

5. The reduction gearbox as defined in claim 3 wherein the gear carrier includes a cylindrical component journalled within the casing and communicating with the annular channel.

6. The reduction gear box as defined in claim 5 wherein the at least one gear is a planet gear within a planetary gear stage and the planetary gear is journalled to the bearing mounted to the gear carrier.

7. The reduction gear box as defined in claim 6 wherein the oil is pumped to the planetary gear by the gear carrier.

8. An oil supply system for a reduction gearbox in a gas turbine engine, the reduction gearbox of the type having at least one reduction epicyclic gear stage, within the casing, the reduction gear stage comprising at least an array of gears meshing together with at least one gear mounted for rotation on a gear carrier and a bearing associated therewith, the engine being subject to normal flight and negative "g" flight conditions; the oil supply system comprising an oil reserve system consisting of a closed reservoir provided adjacent the gear carrier, a restricted inlet opening associated with the reservoir for allowing oil to enter and fill the reservoir in normal flight conditions and a plurality of metered outlet openings to feed the oil from the reservoir to the gear carrier when a negative "g" condition occurs.

9. The oil supply system as defined in claim 8 wherein the closed reservoir is a cavity formed in the casing of the reduction gearbox.

10. The oil supply system as defined in claim 9 wherein there are at least three metered outlet openings.

11. A method of supplying lubricating oil to a reduction gearbox wherein the gearbox includes reduction gear stages and a gear carrier mounting at least a gear rotatable in the gear carrier and an associated bearing, the method comprising:

- forming a closed reservoir radially outwardly of the gear carrier within the reduction gear box, and a restricted opening to the reservoir for delivering lubricating oil through;
- forming an annular oil channel surrounding the gear carrier and in oil communication therewith;
- providing metered openings to communicate the reservoir with the annular oil channel so that the oil trapped in the reservoir is distributed into the oil channel to the gear carrier when a temporary pressure drop occurs in the oil delivery system.

12. The method as defined in claim 11 wherein forming the reservoir comprises forming the reservoir as a cavity defined in the casing of the gearbox.

* * * * *